(12) United States Patent
Lindner et al.

(10) Patent No.: US 7,456,974 B2
(45) Date of Patent: Nov. 25, 2008

(54) OPTICAL MEASURING SYSTEM FOR DETECTING GEOMETRIC DATA OF SURFACES

(75) Inventors: Michael Lindner, Leutenbach (DE); Bernd Schmidtke, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/569,195

(22) PCT Filed: Jun. 19, 2004

(86) PCT No.: PCT/DE2004/001292

§ 371 (c)(1), (2), (4) Date: Dec. 5, 2006

(87) PCT Pub. No.: WO2005/019768

PCT Pub. Date: Mar. 3, 2005

(65) Prior Publication Data

US 2007/0139059 A1 Jun. 21, 2007

(30) Foreign Application Priority Data

Aug. 18, 2003 (DE) ................ 103 37 894

(51) Int. Cl.
*G01B 9/02* (2006.01)
(52) U.S. Cl. .............. 356/478; 356/479; 356/497
(58) Field of Classification Search ............ 356/478, 356/462, 73.1, 429, 237.2, 241.1, 489, 511, 356/497
See application file for complete search history.

(56) References Cited

U.S. PATENT DOCUMENTS 5,106,192 A    4/1992   Tucker et al.

(Continued)

FOREIGN PATENT DOCUMENTS

DE    198 08 273    9/1999

(Continued)

OTHER PUBLICATIONS

Zhao et al., *Single-Mode Fiber-Based Reflex Sensor for Internal Surface In-Line Measurement of Small Products*, Sensors and Actuators, Elsevier Sequoia S.A., Lausanne, Switzerland, Sep. 30, 2002, vol. 101, No. 1-2, pp. 30-36.

*Primary Examiner*—Tarifur Chowdhury
*Assistant Examiner*—Michael Lapage
(74) *Attorney, Agent, or Firm*—Kenyon & Kenyon LLP

(57) ABSTRACT

An optical measuring system for detecting geometric data of surfaces of at least one object is described, comprising a beam delivery section, a probe system which is connected to the latter and has a plurality of probe outputs for output of a particular measuring beam to an assigned particular surface location and recording the light reflected back by the surface, and having a downstream analyzer unit for determining the geometric data on the basis of light reflected back by the surface locations. A very accurate and mechanically robust determination of surface geometric data, e.g., diameter and roundness of a bore, is achieved by designing the probe system having the probe outputs in such a manner that the relative position of the probe system having the probe outputs positioned in fixed relationship to one another is also determinable in relation to the object(s) at least with regard to several relevant degrees of freedom, in addition to and simultaneously with the determination of the geometric data of the surface(s).

9 Claims, 2 Drawing Sheets

U.S. PATENT DOCUMENTS

| | | |
|---|---|---|
| 5,640,270 A * | 6/1997 | Aziz et al. ................. 359/368 |
| 6,490,046 B1 * | 12/2002 | Drabarek et al. ............ 356/489 |
| 7,092,102 B2 * | 8/2006 | Franz et al. ................. 356/497 |

FOREIGN PATENT DOCUMENTS

| | | |
|---|---|---|
| DE | 198 19 762 | 11/1999 |
| DE | 19819762 | 11/1999 |
| JP | 2002513919 T | 5/2002 |

* cited by examiner

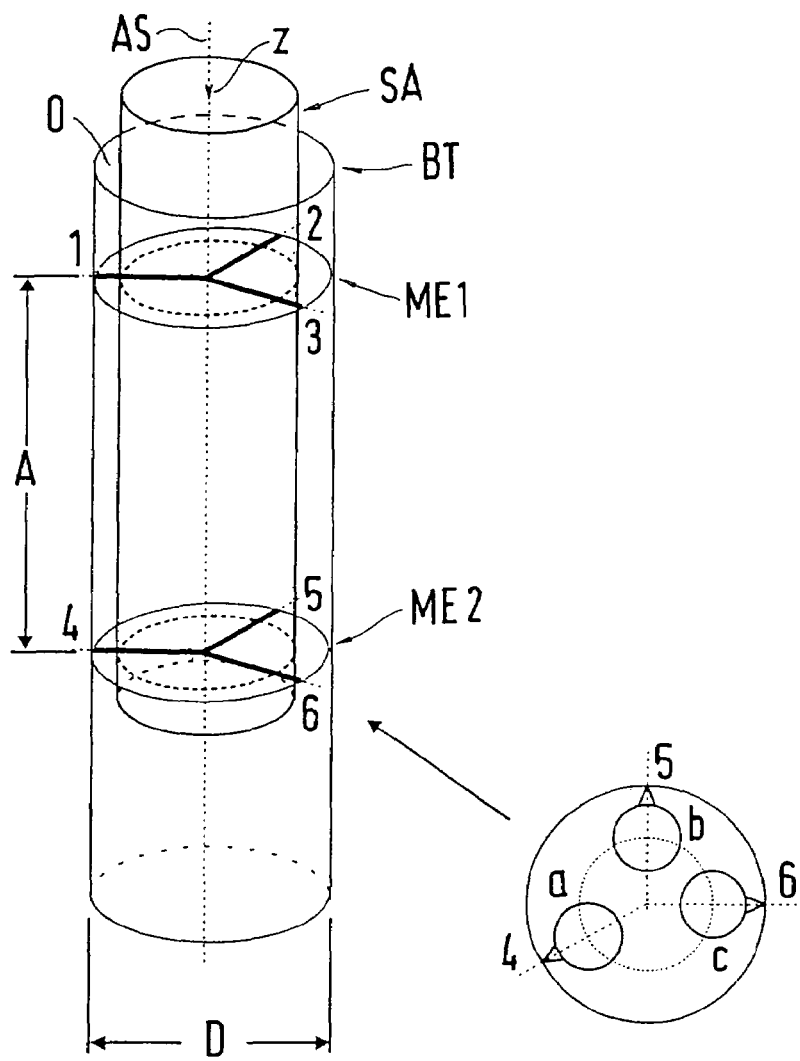
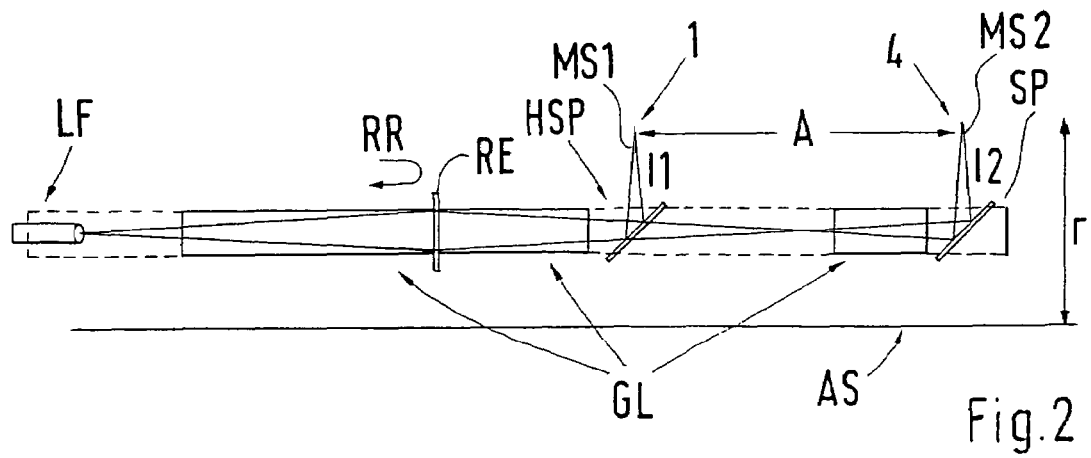

OPTICAL MEASURING SYSTEM FOR DETECTING GEOMETRIC DATA OF SURFACES

FIELD OF THE INVENTION

The present invention relates to an optical measuring system for detecting geometric data of surfaces of at least one object, having a beam delivery section, having a probe system connected to the latter, having a plurality of probe outputs for delivering a particular measuring beam to a particular surface location and recording the light reflected back from the surface, and having a downstream analyzer unit for determining the geometric data on the basis of the light reflected back by the surface locations.

BACKGROUND INFORMATION

Such an optical system is described in German Published Patent Application No. 198 08 273. With this known measuring system, having as its essential component a fiber optic short coherent multi-wavelength heterodyne interferometer, a measuring probe directed at the object surface, and a reference probe to be directed at a plane table on which the component having the surface is mounted, are connected to a beam delivery section having a short coherent broadband light source and a modulation interferometer receiving the light therefrom. Position relationships and changes between the object surface and the bearing device are detectable with this probe system of measuring probe and reference probe and may be taken into account during the surface measuring procedures to reduce and/or rule out measuring errors resulting from such deviations in position. However, other relative local changes between the outputs of the probe system points on the surface, e.g., inaccuracies in the probe guidance or relative movements between probe and component in various degrees of freedom during the measuring procedure, may have effects on measurement of the surface geometry of a component or multiple components in a fixed positional relationship to one another, e.g., distance or roughness or roundness. Such influencing parameters on the measuring procedures are difficult to rule out, in particular in measurements of shape and/or distance related to the manufacturing process.

Today mainly pneumatic measurement methods are used for a robust measurement of shape and distance and/or diameter of guide bores, for example, that will have relevance for the manufacturing process. However, the precision of these methods is technically limited and will probably not be able to comply with increased tolerance demands in the future. However, for high-precision measurements, high-resolution measurement methods in the nanometer range are needed, but such technology may currently be installed only in precision measuring laboratories having vibration isolation.

Mainly punctiform distance sensors are used for the high-resolution determination of shape and diameter on guide bores; the measuring heads of these distance sensors are capable of very accurate determination of the distance from the surface of a component to a reference point. Such punctiform distance sensors must essentially be combined with a shape-measuring machine which guides the sensor mechanically along a defined path over the surface of the component to be scanned to measure the shape of the component. The accuracy of such measurement methods is based essentially on the precision in guidance and the mechanical stability of the shape-measuring machines.

Optical sensors, in particular those that operate by an interferometric principle, have recently made advances as punctiform distance sensors replacing tactile scanners because of the non-contact measurement principle and the resulting advantages. Of the interferometric sensors, in particular the multi-wavelength heterodyne interferometer having a short coherent light source is a rapid punctiform measurement method that has already been tested industrially and is capable of measuring rough industrial surfaces. However, confocal measurement methods are also known as optical measuring systems.

SUMMARY OF THE INVENTION

The object of the present invention is to provide an optical measuring system of the type which mostly prevents distorting influences of changes in position between the measuring probe system and the surface locations as much as possible and using the simplest possible measures, in particular in determining surface geometric data having relevance to the manufacturing process.

This object is achieved according to which the probe system having the probe outputs is designed in such a way that in addition to the geometric data on the surface(s), the relative position of the probe system having the probe outputs positioned in fixed positional relationship to one another may be determined at the same time in relation to the object(s) at least with regard to several relevant degrees of freedom.

Using this design of the probe system, changes in position between the probe outputs and the surface locations which also occur during a manufacturing operation may be determined and eliminated through calculations in determining the geometric data. No complex guidance elements for probe guidance or complex vibration isolation measures are required. This yields a high-precision mechanically sturdy measurement of the relevant shape characteristics of the component.

For example, a borehole or a cavity having parallel wall surfaces may be reliably measured if multiple probe outputs are positioned in at least two measurement planes positioned a distance apart and normal to an axis of the probe system. In this way, tilting between a guide axis of the probe system and a cavity axis may be recognized and/or compensated. Alternatively, multiple probe outputs may also be situated in just one measurement plane.

According to an advantageous embodiment, at least three probe outputs are located in one measurement plane and at least one probe output is located in another measurement plane.

In addition, the measures in which the probe outputs are distributed asymmetrically in the measurement planes are advantageous for the measurement and recognition of reference locations.

Furthermore, such a system using two measurement planes is ideal for measuring guide bores in particular because the measurement geometry in this case is adapted to the function of the component.

According to an advantageous arrangement for measuring boreholes, at least three probe outputs are situated in one measurement plane and at least two probe outputs are situated in another measurement plane.

For complete measurement of the shape of a bore, the measures whereby the at least three probe outputs are situated in an asymmetrical distribution in one measurement plane are also advantageous.

A simple design which is also suitable for a measurement in tight cavities is obtained by combining probe outputs situated one above the other in the direction of the axis of the probe system to form a probe unit which is connected by an optical fiber and a connection point to the beam delivery section.

According to an advantageous embodiment of precision measurements of the surface geometry, the measuring system has an interferometric measuring device.

An easy-to-handle embodiment is achieved by designing the interferometric measuring device as a white-light interferometer and/or a heterodyne interferometer.

In an embodiment that is favorable for construction and operation, the beam delivery section has a broadband short coherent light generating unit and a modulation interferometer having interferometer arms containing multiple different optical path lengths and acousto-optical modulators and the probe system is assigned to a measuring interferometer, in which optical path length differences which are greater than the coherence length of the short coherent light and have been impressed on the modulation interferometer are cancelled.

If the analyzer unit is designed for simultaneous detection and analysis of the light received by it, reflected back from the surface locations via the probe outputs and measuring channels assigned to them, then the result is practically no delay in actual time.

Owing to the high reading rate of the heterodyne technique, it is also possible to suppress interfering vibration up to very high cutoff frequencies $1/\Delta T$. Simultaneous detection and analysis of the measuring channels permits complete utilization of this high cutoff frequency regardless of the number of channels.

In various advantageous embodiments using a white-light heterodyne interferometer in combination with multiple measuring channels, more than two interferometer arms or feedback loops formed in the interferometer arms are present in the modulation interferometer for generating different combinations of optical path differences and frequency shifts for different heterodyne frequencies.

With an appropriate design, the aforementioned measures allow simultaneous determination of all degrees of freedom of an ideal cylinder within one measurement operation using a very short measurement time, for example. This is achieved, e.g., by situating the probe outputs in such a way that the surface to be measured on the component itself functions as a reference for determination of the geometric data and/or measured quantities.

The shape of the component may be determined separately from the position coordinates of the probe system and/or probe outputs to the component based on a knowledge of the degrees of freedom and a rough knowledge of the lateral coordinates of the positioning mechanics. With this measuring principle, the precision is determined essentially by the properties of the probe system itself, which may have a stable and precise design. Therefore, first of all, a recognition of and, if necessary, compensation for mechanical vibration is achieved from the beginning, thus permitting integration of high-precision optical precision measurement technology into mechanically unstable environments. In addition, a high precision of guidance axes of a shape-measuring machine is unnecessary, resulting in considerable cost savings.

Measures in which a guidance device is provided for relative adjustment of the object with respect to the probe system, a relative adjustment being executable in the z direction and/or by rotation, contribute toward an accurate measurement of the surface. In the case of rotationally symmetrical cavity surfaces, the rotational adjustment is of particular importance because through a suitable mathematical analysis, the shape profile and in particular the diameter and roundness may be determined in a mechanically robust and highly precise manner. Due to the additional z shift, the result is an analysis of the entire cylindrical shape.

BRIEF DESCRIPTION OF THE DRAWINGS

FIG. 1 shows an exemplary embodiment of a probe system with respect to a component in a schematic perspective lateral view and in a cross-sectional view.

FIG. 2 shows a part of the probe system and a beam path in a lateral schematic view.

DETAILED DESCRIPTION

A section of a probe system SA of the optical measuring system illustrated in FIG. 1 is inserted into a cylindrical cavity in a component BT for detecting multiple points of the surface O surrounding the cavity and is adjustable in the z direction and/or by rotation along a guidance axis of a guidance device (not shown) in the cylindrical cavity, a probe axis AS corresponding essentially to the guide axis and also to an axis of the cavity or at least running parallel thereto.

However, in reality this ideal case is difficult to achieve in a manufacturing operation in particular.

Probe system SA has a plurality of probe outputs 1, 2, 3, 4, 5, 6, three of which are located in two measurement planes ME1, ME2 which are a distance A apart from one another and are normal to probe axis AS, as also shown in the cross-sectional diagram of plane ME2. The cylindrical cavity has a diameter D. Two probe outputs 1, 4; 2, 5; 3, 6 positioned one above the other in the z direction are combined to form a probe unit a, b, c in the form of a double probe.

FIG. 2 shows such a double probe a, b, c in relation to probe axis AS and measuring beams MS1, MS2 directed to two surface locations separated from one another by distance A in the z direction. First measuring beam MS1 is guided by a semitransparent mirror HSP via the corresponding probe output 1 to the respective surface location, while second measuring beam MS2 runs through semitransparent mirror HSP and a grin lens GL to a mirror SP and from there via a corresponding additional probe output 4 to the corresponding surface location, so that, for example, nominal radius r of the cylindrical cavity and/or its uniformity may be determined. Double probe a, b, c is part of a measuring interferometer having a reference surface RE on which a reference reflection RR is formed. The light having reference reflection RR, guided into the double probe and reflected back again by it, and the light reflected back by the surface locations are guided via a particular monomode optical fiber LF assigned to double probes a, b, c. The optical path length of first measuring beam MS1 between reference surface RE and the particular surface location is I1, while the optical path length of second measuring beam MS2 between reference surface RE and the particular surface location is I2. These optical path lengths I1, I2 correspond to a particular optical path length impressed upon the particular light beams in a modulation interferometer MI as shown in FIG. 4 in a beam delivery section of the optical measuring system.

Figure 3:
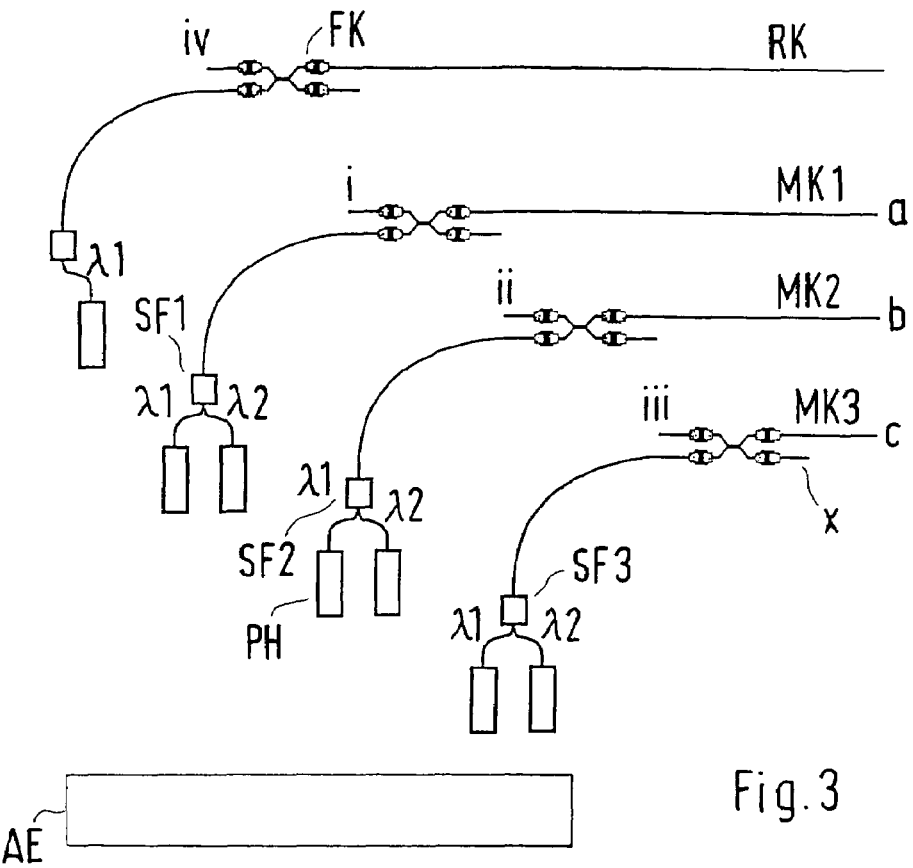
FIG. 3 shows a schematic diagram of a plurality of measuring channels obtained with the probe system according to FIG. 1 connected to an analyzer unit.

As FIG. 3 shows, the light returned back via double probes a, b, c goes over assigned measuring channels MK1, MK2, MK3 and fiber coupler FK as well as via receiver units, each having a spectral filter SF1, SF2, SF3, for filtering out individual wavelengths $\lambda_1$, $\lambda_2$ to particular photoreceiver PH, where it is converted into electric signals which are picked up and analyzed in analyzer unit AE to calculate from these signals the geometric data on the surface(s). In addition, a reference channel RK may also be connected for additional analytical measures. Measuring channels MK1, MK2, MK3 and reference channel RK are connected via particular connecting points i, ii, iii, iv of fiber coupler FK and corresponding optical fibers LF to the output of modulation interferometer MI and/or mixer. In the present case, a free branch x of fiber coupler FK designed as an X unit is not being used because only a Y configuration is needed.

Figure 4:
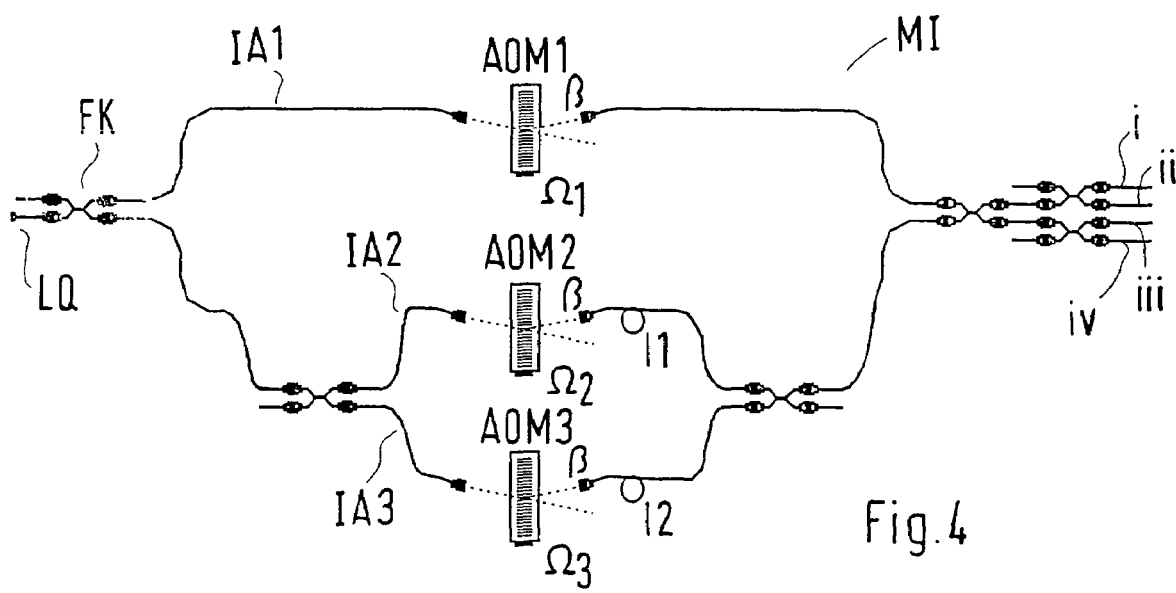
FIG. 4 shows a beam delivery section of the optical measuring system having a modulation interferometer.

As FIG. 4 shows, modulation interferometer MI is supplied with light at the input by a light generating unit, i.e., light source LQ, which generates short coherent broadband light from whose spectrum two wavelengths $\lambda_1$ and $\lambda_2$ having defined bandwidths are selected. In modulation interferometer MI, three interferometer arms IA1, IA2, IA3 are formed; different optical path lengths L1, L2 and particular acousto-optical modulators AOM1, AOM2, AOM3 are provided here for generating corresponding frequency shifts $\Omega_1$, $\Omega_1$, $\Omega_3$ for the heterodyne frequencies of the heterodyne method. Acousto-optical modulators AOM1, AOM2, AOM3 are designed as Bragg cells, for example, and deflect the light into corresponding optical fiber sections at particular output angles β. Different optical path differences are generated due to different optical path lengths I1, I2, these path differences being greater than the coherence length defined by spectral filters SF1 through SF4, so that the light emerging from modulation interferometer MI does not produce interference. However, due to the elimination of these optical path differences in the aforementioned measuring interferometer having probe system SA, the light reflected back by the particular surface locations interferes with the light of reference reflection RR, so the corresponding phase information may be used in the analyzer unit for determining the surface geometric data in a known manner. The separation into modulation interferometer MI and probe system SA and/or measuring interferometer yields an advantageous design using an easy-to-handle probe system SA, as explained in publication German Published Patent Application No. 198 08 273 cited above with additional evidence.

In the exemplary embodiment described here, for example, the shape of the cylindrical guide bore is detected by probe system SA which is inserted into the bore. Component BT (or probe system SA) is rotated about an axis of rotation by a simple mechanical guidance device (not shown) as well as being shifted linearly in the z direction along the axis of the bore. The guide axes of the mechanical movement need not correspond accurately to one another or to the bore axis of component BT.

Probe outputs 1, 2, 3, 4, 5, 6 are situated in two measurement planes ME1, ME2 so that all five degrees of freedom relevant to measuring an ideal cylinder may be determined. These include specifically the four coordinates that unambiguously define the position of the cylinder axis with respect to probe axis AS (two lateral position coordinates and two tilt angles as well as one remaining degree of freedom for the diameter of the ideal cylinder).

A system having an identical spacing in both measurement planes will also have the additional advantage of interchangeability of the two measurement planes. This is important in particular in measuring guide bores.

The spacing of three probe outputs 1, 2, 3 and 4, 5, 6 in two measurement planes ME1, ME2 according to FIG. 1 is preferably asymmetrical. Integrating two outputs situated one above the other in each of three double probes a, b, c has the advantage of saving space in particular in the case of probe systems SA for small diameter bores.

The spacings of all six measuring channels assigned to probe outputs 1, 2, 3, 4, 5, 6 are preferably determined simultaneously at a high reading rate. The optical measuring system shown here having a 2λ white-light heterodyne interferometer is preferably designed for three parallel double receivers, each having two photoreceivers PH for wavelengths $\lambda_1$ and $\lambda_2$ plus a receiver for optional reference channel RK, as shown in FIG. 3. Each double receiver receives the superimposed signals of the particular light from two outputs of a particular double probe a, b, c. The distance information of a double probe is separated by using two heterodyne frequencies $\Omega_1$, $\Omega_2$, which are spectrally separated in signal analysis. According to FIG. 4, modulation interferometer MI is supplemented for this concept with a third interferometer arm IA3 containing a third acousto-optical modulator AOM3. The aforementioned optical path differences in interferometer arms IA1, IA2, IA3 are adapted to the path differences in the double probe. Similarly, the required optical path differences and heterodyne frequencies may also be formed, e.g., over only two interferometer arms in which feedback loops have been situated so that the optical path lengths and corresponding acousto-optical modulators are run through repeatedly.

A system of at least five measuring channels allows independent determination of a total of five degrees of freedom within an interval ΔT, which is determined by the measuring system. The multiple probe having such a design may be guided along the component surface using a simple mechanical positioning device so that the probe travels successively over the surface to be measured. This results in an overall data set from which it is possible to determine the complete shape of the surface in a mechanically robust manner, i.e., independently of external mechanical influences. Only measurement time ΔT within which the five degrees of freedom are determined is important for the mechanical robustness. Thus vibrations and changes in position up to a cutoff frequency of 1/ΔT may be suppressed.

Such a mechanical guidance by a mechanical positioning device may be accomplished, e.g., by rotation of the component about an axis of rotation and simultaneous shifting of the probe along the Z axis. These mechanical movements may take place inaccurately within wide limits. In addition, the guide axes need not correspond exactly to one another or to the component axis.

The use of fewer than five measuring channels is advisable under some circumstances if certain degrees of freedom may be kept adequately stable, e.g., by the mechanical positioning device. For example, the two channels in the second measurement plane may be omitted if the tilt angle of the probe axis in relation to the component axis is otherwise stabilized.

What is claimed is:

1. An optical measuring system for detecting geometric data of a surface of at least one object, comprising:
    a beam delivery section,
    a probe system connected to the beam delivery section and including a plurality of probe outputs for delivering at least one measuring beam to at least one assigned surface location and recording light reflected back from the surface; and
    a downstream analyzer unit for determining the geometric data on the basis of the light reflected back by the at least one surface location, wherein:
    the probe system is designed in such a way that in addition to the geometric data of the surface, a relative position of the probe system (SA) having the probe outputs positioned in fixed relationship to one another, with respect to the at least one object is determinable at the same time, at least with regard to multiple relevant degrees of freedom; and wherein beam delivery section includes:

a broadband, short coherent light generating unit, and a modulation interferometer that includes a plurality of interferometer arms having different optical path lengths and acousto-optical modulators, and the probe system is assigned to an interferometric measuring device in which optical path length differences that are impressed on the modulation interferometer and are greater than a coherence length of a short coherent light are eliminated.

2. The measuring system as recited in claim 1, wherein one of:

the probe outputs are situated in only one measurement plane, and the probe outputs are positioned in at least two normal measurement planes with respect to an axis of the probe system spaced a distance apart from one another.

3. The measuring system as recited in claim 2, wherein:

at least three of the probe outputs are situated in a first measurement plane, and at least one of the remaining probe outputs is situated in another measurement plane.

4. The measuring system as recited in claim 1, wherein the probe outputs are distributed asymmetrically in at least one measurement plane.

5. The measuring system as recited in claim 1, further comprising:

an optical fiber; and a connecting point, wherein:

the probe outputs that are situated one above the other in a direction of an axis of the probe system are combined to form a probe unit that is connected to the beam delivery section via the optical fiber and the connecting point.

6. The measuring system as recited in claim 1, wherein:

the interferometric measuring device includes at least one of a whitelight interferometer and a heterodyne interferometer.

7. The measuring system as recited in claim 1, wherein:

the downstream analyzer unit simultaneously detects and analyzes the reflected light received via the probe outputs and measuring channels assigned thereto.

8. The measuring system as recited in claim 1, wherein:

more than two interferometer arms or feedback loops provided in the interferometer arms are present in the modulation interferometer for generating different combinations of optical path differences and frequency shifts for different heterodyne frequencies.

9. The measuring system as recited in claim 1, further comprising:

a guidance device for performing a relative adjustment of the at least one object with respect to the probe system and by which a relative adjustment at least one of (a) in at least a z direction and (b) achieved by rotation is able to be implemented.

* * * * *